(12) United States Patent
Kelly et al.

(10) Patent No.: US 9,096,778 B2
(45) Date of Patent: Aug. 4, 2015

(54) CYANOACRYLATE ADHESIVE WITH IMPROVED WATER RESISTANCE

(71) Applicant: Henkel Ireland Limited, Monheim (DE)

(72) Inventors: Ruth Kelly, Dublin (IE); Robert J. Lambert, Dublin (IE); Lisa McDonagh, Dublin (IE); Marisa Phelan, Roscrea (IE); Cormac Duffy, Co. Louth (IE); Nigel Fay, Duesseldorf (DE)

(73) Assignee: Henkel IP & Holding GmbH, Duesseldorf (DE)

( * ) Notice: Subject to any disclaimer, the term of this patent is extended or adjusted under 35 U.S.C. 154(b) by 226 days.

(21) Appl. No.: 13/784,968

(22) Filed: Mar. 5, 2013

(65) Prior Publication Data

US 2013/0174981 A1    Jul. 11, 2013

Related U.S. Application Data

(63) Continuation of application No. PCT/EP2012/056270, filed on Apr. 5, 2012.

(30) Foreign Application Priority Data

Apr. 12, 2011    (EP) .................................... 11162054

(51) Int. Cl.
     *C09J 4/00*    (2006.01)
(52) U.S. Cl.
     CPC ......................................... *C09J 4/00* (2013.01)
(58) Field of Classification Search
     CPC .......................................................... C09J 4/00
     USPC ........................................... 525/230; 156/329
     See application file for complete search history.

(56) References Cited

U.S. PATENT DOCUMENTS

| | | | |
|---|---|---|---|
| 2,784,127 A | 3/1957 | Joyner et al. | |
| 3,262,828 A | 7/1966 | Mallory et al. | |
| 3,527,841 A | 9/1970 | Wicker Jr. et al. | |
| 3,722,599 A | 3/1973 | Banitt et al. | |
| 3,940,362 A | 2/1976 | Overhults | |
| 3,995,641 A | 12/1976 | Kronenthal et al. | |
| 4,139,693 A | 2/1979 | Schoenberg | |
| 4,277,538 A | 7/1981 | Beckmann et al. | |
| 4,460,759 A | 7/1984 | Robins | |
| 4,556,700 A | 12/1985 | Harris et al. | |
| 4,622,414 A | 11/1986 | McKervey | |
| 4,636,539 A | 1/1987 | Harris et al. | |
| 4,695,615 A | 9/1987 | Leonard et al. | |
| 4,718,966 A | 1/1988 | Harris et al. | |
| 4,753,695 A | 6/1988 | Alexander et al. | |
| 4,837,260 A | 6/1989 | Sato et al. | |
| 4,855,461 A | 8/1989 | Harris | |
| 4,906,317 A | 3/1990 | Liu | |
| 5,314,562 A | 5/1994 | McDonnell et al. | |
| 5,328,687 A | 7/1994 | Leung et al. | |
| 6,191,202 B1 | 2/2001 | Greff et al. | |
| 6,294,629 B1 | 9/2001 | O'Dwyer et al. | |
| 6,607,632 B1 * | 8/2003 | McDonnell et al. | ....... 156/331.2 |
| 6,835,789 B1 | 12/2004 | Kneafsey et al. | |
| 7,659,423 B1 | 2/2010 | McArdle | |
| 7,718,821 B1 | 5/2010 | Bigi et al. | |

FOREIGN PATENT DOCUMENTS

| | | | |
|---|---|---|---|
| EP | 0137849 | | 8/1984 |
| EP | 0151527 | | 8/1985 |
| EP | 0209067 | | 1/1987 |
| GB | 1373559 | | 11/1974 |
| GB | 1373559 A | * | 11/1974 |
| GB | 1430506 | | 3/1976 |
| GB | 1529105 | | 10/1978 |
| JP | 52076344 | | 6/1977 |
| JP | 6100838 | | 12/1997 |
| SU | 1328361 | | 8/1987 |
| SU | 1564172 | | 5/1990 |
| WO | 9807802 | | 2/1998 |

* cited by examiner

*Primary Examiner* — Kelechi Egwim

(74) *Attorney, Agent, or Firm* — Steven C. Bauman

(57) ABSTRACT

The present invention relates generally to cyanoacrylate adhesives and, more particularly, to a one-part adhesive, comprising one or more 2-cyanoacrylate esters, one or more bis-silanes and optionally one or more monosilanes and to the use of said adhesive as an instant adhesive with improved water resistance.

17 Claims, No Drawings

CYANOACRYLATE ADHESIVE WITH IMPROVED WATER RESISTANCE

The present invention relates generally to cyanoacrylate adhesives and, more particularly, to a one-part adhesive, comprising one or more 2-cyanoacrylate esters, one or more bis-silanes and optionally one or more monosilanes and to the use of said adhesive as an instant adhesive with improved water resistance.

Cyanoacrylate adhesives are known for their fast adhesion and ability to bond a wide variety of substrates. They are marketed as instant adhesives. They are useful as an all-purpose adhesive since they are a single component adhesive, very economical as only a small amount is required for each application and generally do not require any equipment to facilitate curing.

Due to an insufficient water resistance, it is normally observed that an adhesive joint formed by a cured cyanoacrylate adhesive it not durable when being exposed to high humidity conditions.

It is known from the prior art that specific one part or two part cyanoacrylate-based adhesives can be used for forming durable and water resistant adhesive bonds, especially on glass.

In this context Japanese patent application No. 1993-207634 discloses two-part adhesives systems where silanes are employed to pretreat glass prior to the application of the cyanoacrylate adhesive.

The inconvenience of this two-part system is overcome by a one-part adhesive composition as disclosed in WO 1998/07802 A1. Here, a water resistant bond is formed by a one-part glass-bonding adhesive comprising a cyanoacrylate monomer; at least one plasticizer in the amount of 15 to 60% w/w by weight of the composition; and at least one silane in the amount of 0.01% to 5.0% w/w by weight of the composition. Suitable silane components of the aforementioned invention only include monosilanes.

Notwithstanding the state of the technology, it would be desirable to further improve the water resistance of adhesive joints formed by cured cyanoacrylate adhesives. In particular, it would be desirable to provide one-part cyanoacrylate adhesives, which are storage stable and have improved water resistance properties over comparable adhesive formulation from the prior art.

The present invention meets those desires by providing a one-part adhesive, comprising
a) one or more 2-cyanoacrylate esters in a amount of at least 30 wt.-%, based on the total amount of the one-part adhesive;
b) one or more bis-silanes; and
c) optionally one or more monosilanes.

The one-part adhesives of the present invention have the advantage that the adhesive joints formed by the cured products of said adhesives exhibit an improved water resistance. Thus, it is possible to bond different substrates, even if these substrates are in permanent or frequent contact with moisture or water. Consequently, the one-part adhesive of the present invention can be used for all household items even tableware, which will undergo washing cycles. Another advantage of the one-part adhesive of the present invention is the improved durability of the formed adhesive joints to aggressive environments. Thus, it is possible to expose bonded substrates to water and/or to wash said bonded substrates in a household dishwasher, even if alkaline dishwashing detergents are used.

The present invention further provides the cured product of the adhesive of the present invention and a method of bonding substrates which comprises the steps of applying a one-part adhesive composition of the present invention to at least one of the substrates and bringing the substrates together.

In a further aspect, the present invention relates to the use of a one-part adhesive of the present invention as an instant adhesive with improved water resistance.

In another aspect, the present invention relates to the use of one or more bis-silanes of the present invention to improve the water resistance of an adhesive, which comprises one or more 2-cyanoacrylate ester. Particularly good water resistance of the aforementioned adhesives can be achieved by using one or more bis-silanes of the present invention in combination with one or more monosilane of the present invention.

As used herein, the term "one-part" refers to an adhesive composition where one or more bis-silanes and optionally one or more monosilanes are mixed with the one or more 2-cyanoacrylate esters prior to use. The one-part adhesive of the present invention is preferably storage-stable, which means that the adhesive formulation remains homogeneous, as determined by unenhanced visual inspection, when stored for a period of at least about 5 days at 22° C. in a sealed container.

The bis-silane and the monosilane, if present, are free and mobile components of the one-part adhesive of the present invention, which means that said silane compounds are not immobilized on a carrier material, such as a solid surface.

In the present invention the water resistance is measured by determining the humidity resistance and/or the dishwasher resistance of an adhesive joint formed by the cured product of the one-part adhesive of the present invention. The humidity resistance and the dishwasher resistance can be determined as described in the examples.

The one-part adhesive of the present invention comprises one or more 2-cyanoacrylate esters in an amount of at least 30 wt.-%, based on the total amount of the one-part adhesive. When the amount of one or more 2-cyanoacrylate esters is less than 30 wt.-%, the resulting adhesive is not capable of forming stable and durable bonds, especially when being exposed to elevated temperatures and/or high humidity conditions.

Suitable 2-cyanoacrlyate esters may be of formula

wherein $R^a$ is selected from alkyl, alkoxyalkyl, cycloalkyl, haloalkyl, alkenyl, alkynyl, arylalkyl, or aryl groups.

Desirably, the 2-cyanoacrylate ester is selected from alkyl 2-cyanoacrylates, alkoxyalkyl 2-cyanoacrylates, di-cyanoacrylates and/or combinations thereof.

Suitable alkyl 2-cyanoacrylates include $C_{1-15}$ alkyl 2-cyanoacrylates, such as methyl 2-cyanoacrylate, ethyl 2-cyanooacrylate, n-propyl 2-cyanoacrylate, iso-propyl 2-cyanoacrylate, n-butyl 2-cyanoacrylate, iso-butyl 2-cyanoacrylate, sec-butyl 2-cyanoacrylate, n-pentyl 2-cyanoacrylate, neo-pentyl 2-cyanoacrylate, n-hexyl 2-cyanoacrylate, iso-hexyl 2-cyanoacrylate, n-heptyl 2-cyanoacrylate, 2-ethylhexyl 2-cyanoacrylate, n-octyl 2-cyanoacrylate, 2-octyl 2-cyanoacrylate, n-nonyl 2-cyanoacrylate, and n-decyl 2-cyanoacrylate.

Suitable alkoxyalkyl 2-cyanoacrylates include $C_{3-10}$ alkoxyalkyl 2-cyanoacrylates, such as methoxymethyl 2-cyanoacrylate, ethoxymethyl 2-cyanoacrylate, 2-methoxyethyl 2-cyanoacrylate, 2-ethoxyethyl 2-cyanoacrylate, 3-methoxypropyl 2-cyanoacrylate, 3-ethoxypropyl 2-cyanoacrylate, and 3-propoxypropyl 2-cyanoacrylate.

Suitable di-cyanoacrylates include 1,6-hexanediol-bis(2-cyanoacrylate), 1,8-octanediol-bis(2-cyanoacrylate), 1,10-decanediol-bis(2-cyanoacrylate), ethylene glycol 2,2'-dicyanoacrylate, 2-butene-1,4-diol bis(2-cyanoacrylate), and 2-butyne-1,4-diol bis(2-cyanoacrylate).

Other desirable 2-cyanoacrylate esters which may be used in the one-part adhesive of the invention include tetrahydrofuryl 2-cyanoacrylate, propargyl 2-cyanoacrylate, allyl 2-cyanoacrylate, 2,2,2-trifluoroethyl 2-cyanoacrylate, and 2,2,3,3-tetrafluoropropyl 2-cyanoacrylate.

In a preferred embodiment of the present invention the 2-cyanoacrylate ester is selected from allyl 2-cyanoacrylate, 2-methoxyethyl 2-cyanoacrylate, 2-ethoxyethyl 2-cyanoacrylate, methyl 2-cyanoacrylate, ethyl 2-cyanoacrylate, n-propyl 2-cyanoacrylate, isopropyl 2-cyanoacrylate, n-butyl 2-cyanoacrylate, tetrahydrofuryl 2-cyanoacrylate, n-pentyl 2-cyanoacrylate, neopentyl 2-cynanoacrylate, cyclohexyl 2-cyanoacrylate, 1-octyl 2-cyanoacrylate, and/or 2-octyl 2-cyanoacrylate and/or combinations thereof. Preferably, ethyl 2-cyanoacrylate and/or n-butyl 2-cyanoacrylate are used in the present invention, although other 2-cyanoacrylate esters may also be used.

The 2-cyanoacrylate esters of the present invention are known in the art and are described in, for example, U.S. Pat. No. 5,328,687 of Leung et al., U.S. Pat. No. 3,527,841 of Wicker et al., U.S. Pat. No. 3,722,599 of Robertson et al., U.S. Pat. No. 3,995,641 of Kronenthal et al., U.S. Pat. No. 3,940,362 of Overhults, U.S. Pat. Nos. 7,718,821 and 7,659,423, both of McArdle et al.

It is desirable that the one or more 2-cyanoacrylate esters are present in an amount of at least 40 wt.-%, more preferably in amount of at least 55 wt.-%, and particularly preferably in an amount of at least 75 wt.-%, each based on the total amount of the one-part adhesive of the present invention. More preferably, the one or more 2-cyanoacrylate esters are present in an amount of 55 to 99.5 wt.-%, preferably in an amount of 70 to 99 wt.-%, and more preferably in an amount of 75 to 98 wt.-%, each based on the total amount of the one-part adhesive of the present invention.

In addition to the aforementioned one or more 2-cyanoacrylate esters, the one-part adhesive of the present invention further comprises one or more bis-silanes. By using a combination of one or more 2-cyanoacrylate esters and one or more bis-silanes in the one-part adhesive of the present invention, the water resistance of said adhesive is improved. Notably, other properties of the one-part adhesive of the present invention, such as its fast bonding speed and the ability to bond a wide variety of substrates are not significantly negatively affected by the addition of the bis-silane component.

The term "bis-silane", as used herein, refers to silane compounds having exactly two silicon atoms per molecule, wherein the two silicon atoms are linked with each other by a divalent linkage group and each silicon atom carries three additional substituents, wherein at least one of the additional substituents is preferably an alkoxy residue. Consequently, the bis-silane of the present invention comprises two terminal silyl groups, preferably two terminal alkoxy silyl groups.

The divalent linkage group of the bis-silane of the present invention can be a straight or branched alkylene group of 1 to 40, preferably of 2 to 20 and more preferably of 2 to 10 carbon atoms, wherein ethylene, propylene or butylene are preferred divalent linkage groups.

In one embodiment of the present invention the terminal silyl group of the bis-silane of the present invention is represented by formula

*—Si($R^b$)$_u$(O$R^c$)$_{3-u}$ wherein u is 0, 1 or 2, each $R^b$ is independently selected from hydrogen, halogen, alkyl, cycloalkyl, alkenyl, aryl or acyl and each $R^c$ is independently selected from alkyl, cycloalkyl, alkenyl, aryl or acyl. In a particularly preferred embodiment u is 0 and $R^c$ is selected from alkyl, wherein preferred alkyl groups include methyl, ethyl, n-propyl and iso-propyl. Suitable terminal silyl groups of the bis-silane of the present invention include trimethoxysilane, triethoxysilane, tri-n-propoxysilane and/or tri-iso-propoxysilane groups.

The bis-silane of the present invention is preferably a non-polymeric compound, which means that the molecular weight of said bis-silane is preferably less than 1000 g/mol, more preferably less than 750 g/mol, and particularly preferably less than 500 g/mol.

Suitable bis-silanes of the present invention may be represented by formula (I), $$(R^4O)_{(3-q)}(R^3)_q Si-B-Si(R^1)_p(OR^2)_{(3-p)} \quad \text{formula (I)}$$

wherein p is 0 to 3, q is 0 to 3, B represents a divalent linkage group comprising 1 to 40 carbon atoms, each $R^1$ and each $R^3$ is independently selected from hydrogen, halogen, alkyl, such as $C_{1-5}$ alkyl, cycloalkyl, alkenyl, aryl or acyl and each $R^2$ and each $R^4$ is independently selected from alkyl, such as $C_{1-5}$ alkyl, cycloalkyl, alkenyl, aryl or acyl.

The aforementioned alkyl, cycloalkyl, alkenyl, aryl or acyl residues may also suitably be substituted with one or more substituents. Preferred substituents include fluorine, chlorine, bromine or iodine.

The divalent linkage group B of formula (I) can be a straight or branched alkylene group of 1 to 24, preferably of 2 to 20 and more preferably of 2 to 10 carbon atoms, wherein ethylene, propylene or butylene are preferred. In an alternative embodiment the divalent linkage group B of formula (I) comprises 1 to 24, preferably of 2 to 20 and more preferably 2 to 10 carbon atoms and at least one sulfur atom. Thus, the divalent linkage group may be of formula

*—(CH$_2$)$_k$—S—(CH$_2$)$_l$—* wherein k is 1 to 5 and l is 1 to 5.

In one embodiment of the present invention p and q of formula (I) are each 0 and/or each $R^2$ and each $R^4$ of formula (I) is methyl, ethyl, n-propyl or iso-propyl.

The bis-silane of the present invention may be selected from a broad variety of alkoxy silanes. Preferred bis-silanes of the present invention are selected from 1,1-Bis(trimethoxysilyl)methane, 1,1-Bis(triethoxysilyl)methane, 1,1-Bis(tripropoxysilyl)methane, 1,2-Bis(trimethoxysilyl)ethane, 1,2-Bis(triethoxysilyl)ethane, 1,2-Bis(tripropoxysilyl)ethane, 1,3-Bis(trimethoxysilyl)propane, 1,3-Bis(triethoxysilyl)propane, 1,3-Bis(tripropoxysilyl)propane, 1,4-Bis(trimethoxysilyl)butane, 1,4-Bis(triethoxysilyl)butane, 1,4-Bis(tripropoxysilyl)butane, 1,5-Bis(trimethoxysilyl)pentane, 1,5-Bis(triethoxysilyl)pentane, 1,5-Bis(tripropoxysilyl)pentane, 1,6-Bis(trimethoxysilyl)hexane, 1,6-Bis(triethoxysilyl)hexane, 1,6-Bis(tripropoxysilyl)hexane and/or any combination thereof.

As used above, the term "tripropoxy" refers to tri-n-propoxy and/or tri-iso-propoxy.

Bis-silanes giving a particularly good balance of compatibility and performance include 1,2-Bis(trimethoxysilyl)ethane, 1,2-Bis(triethoxysilyl)ethane, 1,2-Bis(tripropoxysilyl)ethane, 1,3-Bis(trimethoxysilyl)propane, 1,3-Bis(triethoxysilyl)propane, and 1,3-Bis(tripropoxysilyl)propane.

The bis-silanes of the present invention are known in the art and are commercially available form various companies, including Wacker Chemie AG, Gelest Inc. and Evonik Industries AG.

It is further desirable that one or more bis-silanes of the present invention are present in an amount of 0.01 to 0.5 wt.-%, preferably in an amount of 0.015 to 0.25 wt.-%, and more preferably in an amount of 0.02 to 0.1 wt.-%, each based on the total amount of the one-part adhesive of the present invention. The use of the bis-silanes of the present invention in the aforementioned concentration ranges is advantageous, because the resulting one-part adhesives have both excellent storage stability and low viscosity and particularly good water resistance.

The humidity resistance and/or dishwasher resistance can further be improved by using one or more of the aforementioned bis-silanes in combination with one or more monosilanes.

The term "monosilane", as used herein, refers to silane compounds having exactly one silicon atom per molecule with four substituents bonded thereto, with the proviso that not all four substituents are hydrogen. Preferably at least one substituent is an alkoxy residue, wherein it is particularly preferred that three of four substituents are alkoxy residues.

The monosilane of the present invention is preferably a non-polymeric compound, which means that the molecular weight of said monosilane is preferably less than 1000 g/mol, more preferably less than 750 g/mol, and particularly preferably less than 500 g/mol.

The monosilane of the present invention may be represented by formula (II), $$A\text{---}Si(R^5)_n(OR^6)_{(3-n)} \quad \text{formula (II)}$$

wherein n is 0 to 3, preferably 0, 1 or 2, A is a residue comprising 1 to 40, preferably 2 to 10 carbon atoms, each $R^5$ is independently selected from hydrogen, halogen, alkyl, such as $C_{1-5}$ alkyl, cycloalkyl, alkenyl, aryl or acyl and each $R^6$ is independently selected from alkyl, such as $C_{1-5}$ alkyl, cycloalkyl, alkenyl, aryl or acyl.

The aforementioned alkyl, cycloalkyl, alkenyl, aryl or acyl residues may also suitably be substituted with one or more substituents. Preferred substituents include fluorine, chlorine, bromine or iodine.

In one embodiment of the present invention n of formula (II) is 0 and/or each $R^6$ of formula (II) is methyl, ethyl, n-propyl or iso-propyl.

The residue A of formula (II) can be a straight chain, branched, cyclic or linear hydrocarbon residue, preferably comprising 1 to 10 carbon atoms. In some embodiments of the present invention A is an alkyl, cycloalkyl, or alkenyl group.

Alternatively, the residue A can comprise one or more aromatic groups. In this context, it is preferred that the residue A of formula (II) is selected from aralkyl, aralkenyl, or aryl groups.

The term "aralkyl", as used herein, refers to alkyl-aryl linked through an alkyl portion and the alkyl portion preferably contains 1 to 6 carbon. Examples of aralkyl groups include benzyl, ethylphenyl, propylphenyl, naphthylmethyl and the like.

The term "aralkenyl", as used herein, refers to alkenyl-aryl linked through alkenyl (portion and the alkenyl portion preferably contains 1 to 6 carbon.

Desirably, residue A of formula (II) comprises at least one unsaturated carbon-carbon bond and/or at least one oxygen-containing functional group, wherein said oxygen-containing functional group is preferably selected from epoxy, ester, carboxyl, anhydride, and/or (meth)acryloyl groups.

As used herein, the term "(meth)acryloyl" refers to methacryloyl and/or acryloyl.

In exemplary embodiments of the present invention the residue A of formula (II) is selected from one of the following functional groups:

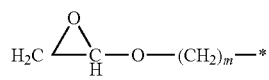

where m is 1 to 10, preferably 1 to 5;

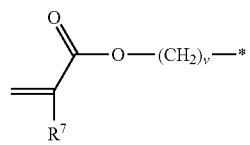

where v is 0 to 10, preferably 1 to 5 and $R^7$ is hydrogen or alkyl, such as methyl or ethyl;

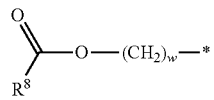

where w is 0 to 10, preferably 1 to 5 and $R^8$ is alkyl, such as methyl or ethyl, or aryl, such as phenyl;

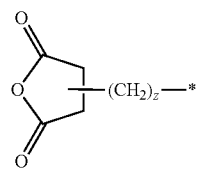

where z is 1 to 10, preferably 2 to 5.

The monosilane of the present invention can be selected from a broad variety of different trialkoxysilanes. Preferred monosilanes of the present invention are selected from vinyltrimethoxysilane, vinyltriethoxysilane, 3-glycidoxypropyltrimethoxysilane, 3-glycidoxypropyltriethoxysilane, ethyltrimethoxysilane, ethyltriethoxysilane, propyltrimethoxysilane, propyltriethoxysilane, butyltrimethoxysilane, butyltriethoxysilane, dimethyldiacetoxysilane, ethyltriacetoxysilane, propytriacetoxysilane, vinylmethyldiacetoxysilane, 1-(meth)acryloxymethyltrimethoxysilane, 2-(meth)acryloxyethyltrimethoxysilane, 3-(meth)acryloxypropyltrimethoxysilane, 1-(meth)acryloxymethyltriethoxysilane, 2-(meth)acryloxyethyltriethoxysilane, 3-(meth)acryloxypropyltriethoxysilane, (meth)acryloxycyclohexyltrimethoxysilane, (meth)acryloxycyclohexyltriethoxysilane, (3-trimethoxysilyl)propylsuccinic anhydride, (3-triethoxysilyl)propylsuccinic anhydride, benzoyloxyethyltrimethoxysilane, benzoyloxypropyltrimethoxysilane, benzoyloxyethyltriethoxysilane, benzoyloxypropyltriethoxysilane, styrylethyltrimethoxysilane, styrylethyltriethoxysilane, styrylpropyltrimethoxysilane, styrylpropyltriethoxysilane and/or any combination thereof.

The aforementioned monosilanes are preferably used in combination with 1,2-Bis(trimethoxysilyl)ethane or 1,2-Bis(triethoxysilyl)ethane.

The monosilanes of the present invention are known in the art and are commercially available from various companies, including Wacker Chemie AG, Gelest Inc. and Evonik Industries AG.

It is further on desirable that one or more monosilanes of the present invention are present in an amount of 0.05 to 2 wt.-%, preferably in an amount of 0.1 to 1 wt.-%, and more preferably in an amount of 0.15 to 0.5 wt.-%, each based on the total amount of the one-part adhesive of the present invention.

A particularly good water resistance on ceramic substrates is achieved, when the bis-silane and the mono-silane of the present invention are both used in the following amounts, each based on the total amount of the present invention:

from 0.01 to 0.5 wt.-% of one or more bis-silanes and from 0.05 to 2 wt.-% of one or more monosilanes;

from 0.015 to 0.25 wt.-% of one or more bis-silanes and from 0.1 to 1 wt.-% of one or more monosilanes;

from 0.02 to 0.1 wt.-% of one or more bis-silanes and from 0.15 to 0.5 wt.-% of one or more monosilanes A particularly good balance of bonding strength and water resistance can be realized, when the molar ratio of silicon atoms from the monosilane component to silicon atoms from the bis-silane component in the one-part adhesive of the present invention is the range of 10:1 to 1:1, preferably in the range of 5:1 to 2:1.

The one-part adhesive of the present invention can further comprise one or more additives, which are preferably selected from anionic polymerization inhibitors, radical polymerization inhibitors, thickeners, plasticizers, accelerators, tougheners, fillers, perfumes, dyes, pigments, heat resistant agents, rheological modifiers, adhesion promoters, colour change indicators and/or any combination thereof.

If present, it is desirable that the total amount of all additives in the one-part adhesive of the present invention is in the range of 0.1 to 50 wt.-%, preferably in the range of 0.5 to 20 wt.-%, and more preferably in the range of 5 to 15 wt.-%, each based on the total amount of the one-part adhesive of the present invention.

One or more anionic polymerization inhibitors can be added to the one-part adhesive of the present invention to increase the stability of the one-part adhesive during storage. Examples of useful inhibitors include sulfur dioxide, sulfur trioxide, nitric oxide, hydrogen fluoride, boron trifluoride, methane sulfonic acid, aromatic sulfonic acids, aliphatic sulfonic acids, phosphoric acids, sulfones and combinations thereof. The amount of inhibitor will suitably be any convenient amount in order to slow down cure of the one-part adhesive. Desirably, inhibitors of anionic polymerization are present at about 0.0001 to about 0.1 wt.-%, based on the total weight of the one-part adhesive.

One or more radical polymerization inhibitors can be added to the one-part adhesive of the present invention for the purpose of capturing radicals, which are formed by light during storage. Such inhibitors are ordinarily of the phenolic type including, for example, hydroquinone and hydroquinone monomethyl ether. Other inhibitors suitable for use herein include 2,2'-methylenebis(4-methyl-6-tertbutylphenol), butylated hydroxytoluene and butylated hydroxyanisole. Desirably, inhibitors of radical polymerization are present at about 0.001 to about 2.0 wt.-%, based on the total weight of the one-part adhesive.

One or more thickener may be added to increase the viscosity of the one-part adhesive. Various polymers can be used as thickeners, and examples include poly(methyl methacrylate) ("PMMA"), poly(ethyl methacrylate) ("PEMA"), methacrylate-type copolymers, acrylic rubbers, cellulose derivatives, polyvinyl acetate, polyvinylacetate-polyvinylchloride copolymers, and poly(α-cyanoacrylate). A suitable amount of thickener is generally about 0.01 to 30 wt.-%, preferably 5.0 to 25 wt.-%, based on the total weight of the one-part adhesive.

One or more plasticizers may also be added to further aid in durability and impact, heat, and moisture resistance. Representative plasticizers include alkyl phthalates, azelates, adipates, sebacates, citrates, phosphates, succinates, benzoates and trimellitates. Desirable plasticizers are dibutyl phthalate, benzylbutyl phthalate, diheptyl phthalate, dibutyl sebacate, glycerin triacetate, acetyltriethylcitrate and diethyleneglycol dibenzoate. Blends of two or more different plasticizers are also beneficial. One or more plasticizers are preferably present in an amount of about 0.05 to about 25 wt.-%, more preferably in an amount of about 1 to about 15 wt.-%, based on the total amount of one-part adhesive.

Accelerators that may be useful in the one-part adhesive include for example calixarenes, oxacalixarenes, silacrowns, cyclodextrins and combinations thereof. Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

Crown ethers are another potentially useful class of accelerators. A host of crown ethers are known. For instance, examples which may be used herein either individually or in combination, or in combination with the calixarenes and oxacalixarenes described above include 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5,3,4,5-naphthyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated by reference.

A further potentially useful class of accelerators are polyethylene glycols and/or ethoxylated compounds. See e.g. U.S. Pat. Nos. 6,294,629 and 6,835,789, the disclosures of each of which are hereby expressly incorporated herein by reference.

One or more accelerator may be present in an amount of about 0.01 to about 10 wt.-%, and preferably in an amount of about 0.1 to about 5 wt.-%, based on the total amount of the one-part adhesive of the present invention.

Fillers that may be useful in the one-part adhesive of the present invention include for example fiber, glass (beads, crushed glass, fragments and the like), rubbers, inorganic fillers and synthetics. Carbon black and inorganic fillers like silica and/or quartz are preferred. One or more fillers are preferably present in an amount of about 0.05 to about 25 wt.-%, more preferably in an amount of about 1 to about 15 wt.-%, based on the total amount of one-part adhesive.

Tougheners, perfumes, dyes, pigments, adhesion promoters and the like may be added to the inventive one-part adhesive depending on use purposes in amounts which do not adversely affect the stability or the properties of the formulation. The use of such additives is within the skill of those practicing in the cyanoacrylate adhesive art and need not be detailed herein.

One typical formulation of the one-part adhesive of the present invention comprises or consists of, based on the total amount of the one-part adhesive:
 a) from 55 to 99.5 wt.-% of one or more 2-cyanoacrylate esters;
 b) from 0.01 to 0.5 wt.-% of one or more bis-silanes;
 c) from 0 to 2 wt.-% of one or more monosilanes; and
 d) from 0 to 42.5 wt.-% of one or more additives.

Another typical formulation of the one-part adhesive of the present invention comprises or consists of, based on the total amount of the one-part adhesive:
 a) from 70 to 99 wt.-% of one or more 2-cyanoacrylate esters;
 b) from 0.015 to 0.25 wt.-% of one or more bis-silanes;
 c) from 0.1 to 1 wt.-% of one or more monosilanes; and
 d) from 0.3 to 28.75 wt.-% of one or more additives.

The present invention also relates to a method of bonding substrates, using the one-part adhesive of the present invention. In that method the one-part adhesive of the present invention is applied to at least one (part) of the substrates and thereinafter the substrates are brought together. Preferred substrates used in the method of the present invention are selected from glass substrates, ceramic substrates, porcelain substrates, wood substrates, plastic substrates and/or metal substrates.

In a further aspect, the present invention relates to the use of the one-part adhesive of the present invention as an instant adhesive with improved water resistance.

In another aspect, the present invention relates to the use of one or more bis-silane of the present invention to improve the water resistance of an adhesive, which comprise one or more 2-cyanoacrylate esters as defined in the present invention, preferably in an amount of at least 30 wt.-%, based on the total amount of the adhesive. It is desirable that the one or more 2-cyanoacrylate esters are present in an amount of at least 40 wt.-%, more preferably in amount of at least 55 wt.-%, and particularly preferably in an amount of at least 75 wt.-%, each based on the total amount of the adhesive. More preferably, the one or more 2-cyanoacrylate esters are present in an amount of 55 to 99.5 wt.-%, preferably in an amount of 70 to 99 wt.-%, and more preferably in an amount of 75 to 98 wt.-%, each based on the total amount of the adhesive.

A particularly good water resistance is achieved by using one or more bis-silanes of the present invention in combination with one or more monosilane of the present invention.

EXAMPLES

In these examples, a number of adhesive formulations were prepared on a weight percent basis and were evaluated for resistance to dishwashing and/or resistance to exposure to humid conditions.

The following abbreviations are used in this section:
PMMA=Polymethylmethacrylate
DC=Dishwasher cycles
RH=Relative humidity
BisTMOE=1,2-Bis(trimethoxysilyl)ethane
BisTEOE=1,2-Bis(triethoxysilyl)ethane
VTMOS=Vinyltrimethoxysilane Dishwasher Resistance Dishwasher resistance was determined by bonding two lap-shear specimens, with a bond area of 322.6 mm$^2$ and allowing them to cure for 24 hours at 22° C. The bonded assemblies were formed by applying the test adhesive formulation to one of the substrates and completing the joint immediately. Following the allotted cure time, the bonds were then subjected to dishwasher cycles in a standard domestic dishwashing machine (type Bosch Exxcel, Ecowash program), using all-in-one dishwasher tablets (detergent, rinse aid and salt). The bonds were examined by hand for integrity at the end of each cycle and the number of washes required to break the bond was recorded. The results are quoted as an average of at least 3 bonds. In the case where ceramic is quoted as one or both sides of the bonded assembly, the glazed side of white ceramic tile is used.

Humidity Resistance

Humidity resistance was determined by preparing lap-shear bonds as described above, with a bond area of 322.6 mm$^2$, clamping and allowing them to cure for at least 24 hours at 22° C. The bonds were then subjected to ageing at elevated temperature and humidity (40° C./98% RH or 30° C./85% RH). The tensile shear bond strengths were then measured in accordance with DIN EN1465 at 22° C. using an Instron tensile tester and a crosshead speed of 2 mm/min. An average result from at least 3 bonds is quoted.

Example 1

Ethyl cyanoacrylate was thickened using 10% polymethylmethacrylate (PMMA) powder. Bis-silanes were added and the resulting formulations were checked for dishwasher resistance and humidity resistance at 40° C./98% RH over a period of 2 weeks on ceramic-ceramic bonded assemblies.

TABLE 1

| Sample No | Silane Identity & wt.-% | DC | Tensile Strength after humidity exposure [N/mm$^2$] | | | |
|---|---|---|---|---|---|---|
| | | | Initial | 3 days | 7 days | 14 days |
| 1[a] | Control | <10 | 3.3 | 0 | 0 | 0 |
| 2 | +0.09 wt.-% BisTMOE | >40 | 4.32 | 1.42 | 0.98 | 0.54 |
| 3 | +0.5 wt.-% BisTMOE | >40 | 3.22 | 2.58 | 1.91 | 2.23 |

[a]comparative example

The assemblies bonded with samples 2 or 3 show a marked increase in the humidity resistance and dishwasher resistance when compared to sample No. 1 (control).

Example 2

Ethyl cyanoacrylate was thickened to a viscosity of 100 mPas (as determined by dynamic shear viscometry) by using a polyvinylchloride/polyvinyl acetate copolymer powder. A crown ether accelerator was also present at 0.1 wt.-%. A monosilane was then added to that control sample (4) alone and in combination with 1,2-Bis(triethoxysilyl)ethane (BisTEOE).

TABLE 2

| Sample No. | Silane Identity & wt.-% | Dishwasher Cycles Ceramic-Ceramic |
|---|---|---|
| 4[a] | Control | <10 |
| 5 | +0.05 wt.-% BisTEOE | >30 |
| 6[a] | +0.2 wt.-% VTMOS | >15 |
| 7 | +0.2 wt.-% VTMOS + 0.05 wt.-% BisTEOE | >100 |

[a]comparative example

Example 2 demonstrates the synergistic effect of a combination of monosilanes and bis-silanes in cyanoacrylate-based adhesive formulations. Sample 5 uses bis-silane alone and shows more than a three-fold increase in ceramic-ceramic dishwasher cycle resistance when compared to the control. Sample 6 contains only a monosilane and in this case the dishwasher cycles increase by approximately 1.5 times that of the control. However, when sample 7 is studied, a combination of the silane levels used in samples 5 and 6, the increase is more than ten-fold.

Example 3

Ethyl cyanoacrylate was thickened to a viscosity of 100 mPas (as determined by dynamic shear viscometry) by using a PMMA powder. A crown ether accelerator was present at 0.1 wt.-% and BisTEOE was also added at 0.05 wt.-%. To this formulation (8), various monosilanes were added at 0.5 wt.-%. They were tested for dishwasher resistance on ceramic-ceramic bonded assemblies and for humidity resistance at 30° C./85% RH on ceramic-white deal joints. The humidity results are quoted as tensile shear bond strengths (N/mm$^2$) and in brackets, the % of the initial bond strength remaining after ageing.

TABLE 3

| Sample No. | Monosilane Identity | DC | Tensile Strength after humidity exposure: [N/mm$^2$] (% of initial strength) | | | |
|---|---|---|---|---|---|---|
| | | | Initial | 4 days | 7 days | 14 days |
| 8 | Formulation | >30 | 2.90 | 0.42 (14.5%) | 0.00 | 0.00 |
| 9 | +Propyltrimethoxysilane | >60 | 2.89 | 1.62 (56%) | 1.2 (41.5%) | 1.16 (40.1%) |
| 10 | +(3-Triethoxysilyl)propyl succinic anhydride | >30 | 3.21 | 0.28 (8.7%) | 0.43 (13.4%) | 0.49 (15.3%) |
| 11 | +VTMOS | >80 | 2.87 | 2.45 (85.4%) | 1.12 (39%) | 1.68 (58.5%) |
| 12 | +Benzoyloxypropyltrimethoxysilane | >40 | 3.00 | 1.4 (46.7%) | 0.21 (7%) | 0.68 (22.7%) |
| 13 | +(3-Acryloxypropyl)trimethoxysilane | >200 | 3.07 | 2.05 (66.8%) | 1.58 (51.5%) | 2.51 (81.8%) |
| 14 | +3-Methacryloxypropyltrimethoxysilane | >20 | 2.56 | 0.84 (32.8%) | 0.29 (11.3%) | 1.33 (52%) |

Example 4

Ethyl cyanoacrylate was thickened to a viscosity of 100 mPas as determined by dynamic shear viscometry using a PMMA powder. A crown ether accelerator was present at 0.1 wt.-%. To this control formulation (15), bis-silanes and monosilanes were added separately and in combination. Each sample was used to form ceramic-white deal assemblies, which were subsequently aged at 30° C./85% RH for 7 days.

TABLE 4

| Sample No. | Silane Identity & wt.-% | Tensile Strength after Humidity Exposure: [N/mm$^2$] (% of initial strength) | |
|---|---|---|---|
| | | Initial | 7 days |
| 15[a] | Control | 5.68 | 0.29 (5.1%) |
| 16 | +0.05 wt.-% BisTEOE | 6.29 | 0.36 (5.7%) |
| 17[a] | +0.2 wt.-% (3-Glycidyloxypropyl)trimethoxysilane | 5.86 | 0.22 (3.8%) |
| 18[a] | +0.2 wt.-% (3-Triethoxysilyl)propyl succinic anhydride | 6.09 | 0 |
| 19 | +0.05 wt.-% BisTEOE + 0.2% wt.-% 3-Glycidyloxypropyl)trimethoxysilane | 4.67 | 1.91 (40.9%) |
| 20 | +0.05 wt.-% BisTEOE + 0.2 wt.-% (3-Triethoxysilyl)propyl succinic anhydride | 3.27 | 1.77 (54.1%) |

[a]comparative example

In this case the combination of monosilanes and bis-silanes (sample 19 & 20) significantly improved the moisture resistance.

What is claimed is:

1. A one-part adhesive, comprising
a) one or more 2-cyanoacrylate esters in a amount of at least 30 wt.-%, based on the total amount of the one-part adhesive;
b) one or more bis-silanes; and
c) optionally one or more monosilanes.

2. The one-part adhesive according to claim 1, wherein the one or more 2-cyanoacrylate esters are selected from allyl 2-cyanoacrylate, 2-methoxyethyl 2-cyanoacrylate, 2-ethoxyethyl 2-cyanoacrylate, methyl 2-cyanoacrylate, ethyl 2-cyanoacrylate, n-propyl 2-cyanoacrylate, iso-propyl 2-cyanoacrylate, n-butyl 2-cyanoacrylate, tetrahydrofuryl 2-cyanoacrylate, n-pentyl 2-cyanoacrylate, neopentyl 2-cyanoacrylate, cyclohexyl 2-cyanoacrylate, 1-octyl 2-cyanoacrylate, and/or 2-octyl 2-cyanoacrylate and/or combinations thereof.

3. The one-part adhesive according to claim 1, wherein the one or more 2-cyanoacrylate esters are present in an amount of 55 to 99.5 wt.-%, based on the total amount of the one-part adhesive.

4. The one-part adhesive according to claim 1, wherein the one or more bis-silanes are represented by formula (I),

$$(R^4O)_{(3-q)}(R^3)_q Si-B-Si(R^1)_p(OR^2)_{(3-p)} \qquad \text{formula (I)}$$

wherein p is 0 to 3, q is 0 to 3, B represents a divalent linkage group comprising 1 to 40 carbon atoms, each $R^1$ and each $R^3$ is independently selected from hydrogen, halogen, alkyl, cycloalkyl, alkenyl, aryl or acyl and each $R^2$ and each $R^4$ is independently selected from alkyl, cycloalkyl, alkenyl, aryl or acyl.

5. The one-part adhesive according to claim 4, wherein the divalent linkage group B of formula (I) is a divalent alkylene group comprising 1 to 10 carbon atoms.

6. The one-part adhesive according to claim 4, wherein p and q of formula (I) are each 0 and/or each $R^2$ and each $R^4$ of formula (I) is methyl, ethyl, n-propyl or iso-propyl.

7. The one-part adhesive according to claim 1, wherein the one or more bis-silanes are selected from 1,1-Bis(trimethoxysilyl)methane, 1,1-Bis(triethoxysilyl)methane, 1,1-Bis(tripropoxysilyl)methane, 1,2-Bis(trimethoxysilyl)ethane, 1,2-Bis(triethoxysilyl)ethane, 1,2-Bis(tripropoxysilyl)ethane, 1,3-Bis(trimethoxysilyl)propane, 1,3-Bis(triethoxysilyl)propane, 1,3-Bis(tripropoxysilyl)propane, 1,4-Bis(trimethoxysilyl)butane, 1,4-Bis(triethoxysilyl)butane, 1,4-Bis(tripropoxysilyl)butane, 1,5-Bis(trimethoxysilyl)pentane, 1,5-Bis(triethoxysilyl)pentane, 1,5-Bis(tripropoxysilyl)pentane, 1,6-Bis(trimethoxysilyl)hexane, 1,6-Bis(triethoxysilyl)hexane, 1,6-Bis(tripropoxysilyl)hexane and/or any combination thereof.

8. The one-part adhesive according to claim 1, wherein the one or more monosilanes are represented by formula (II),

wherein n is 0 to 3, A is a residue comprising 1 to 40 carbon atoms, each $R^5$ is independently selected from hydrogen, halogen, alkyl, cycloalkyl, alkenyl, aryl or acyl and each $R^6$ is independently selected from alkyl, cycloalkyl, alkenyl, aryl or acyl.

9. The one-part adhesive according to claim 8, wherein n of formula (II) is 0 and/or each $R^6$ of formula (II) is methyl, ethyl, n-propyl or iso-propyl.

10. The one-part adhesive according to claim 8, wherein residue A of formula (II) comprises at least one unsaturated carbon-carbon bond and/or at least one oxygen-containing functional group.

11. The one-part adhesive according to claim 8, wherein residue A of formula (II) is selected from alkyl, cycloalkyl, aralkyl, alkenyl, aralkenyl, aryl,

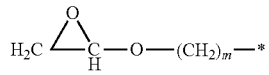

where m is 1 to 10,

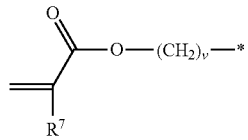

where v is 0 to 10 and $R^7$ is hydrogen or alkyl,

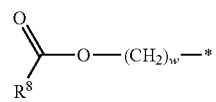

where w is 0 to 10 and $R^8$ is alkyl or aryl, or

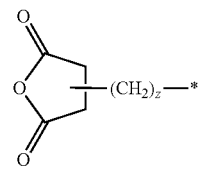

where z is 1 to 10.

12. The one-part adhesive according to claim 1, wherein the one or more monosilanes are selected from vinyltrimethoxysilane, vinyltriethoxysilane, 3-glycidoxypropyltrimethoxysilane, 3-glycidoxypropyltriethoxysilane, ethyltrimethoxysilane, ethyltriethoxysilane, propyltrimethoxysilane, propyltriethoxysilane, butyltrimethoxysilane, butyltriethoxysilane, dimethyldiacetoxysilane, ethyltriacetoxysilane, propyltriacetoxysilane, vinylmethyldiacetoxysilane, 1-(meth)acryloxymethyltrimethoxysilane, 2-(meth)acryloxyethyltrimethoxysilane, 3-(meth)acryloxypropyltrimethoxysilane, 1-(meth)acryloxymethyltriethoxysilane, 2-(meth)acryloxyethyltriethoxysilane, 3-(meth)acryloxypropyltriethoxysilane, (meth)acryloxycyclohexyltrimethoxysilane, (meth)acryloxycyclohexyltriethoxysilane, (3-trimethoxysilyl)propylsuccinic anhydride, (3-triethoxysilyl)propylsuccinic anhydride, benzoyloxyethyltrimethoxysilane, benzoyloxypropyltrimethoxysilane, benzoyloxyethyltriethoxysilane, benzoyloxypropyltriethoxysilane, styrylethyltrimethoxysilane, styrylethyltriethoxysilane, styrylpropyltrimethoxysilane, styrylpropyltriethoxysilane and/or any combination thereof.

13. The one-part adhesive according to claim 1, wherein the one or more bis-silanes are present in an amount of 0.01 to 0.5 wt.-% and/or the one or more monosilanes are present in an amount of 0.05 to 2 wt.-%, each based on the total amount of the one-part adhesive.

14. The cured product of the adhesive according to claim 1.

15. A method of bonding substrates which comprises the steps of applying a one-part adhesive composition according to claim 1 to at least one of the substrates and bringing the substrates together.

16. The method according to claim 15, wherein at least one of the substrates is selected from glass substrates, ceramic substrates, porcelain substrates, wood substrates, plastic substrates and/or metal substrates.

17. The one-part adhesive according to claim 1 as an instant adhesive with improved water resistance.

* * * * *